C. J. WOOD.
MORTISE FOR PIPE JOINTS.
APPLICATION FILED MAY 12, 1919.
1,369,155.
Patented Feb. 22, 1921.
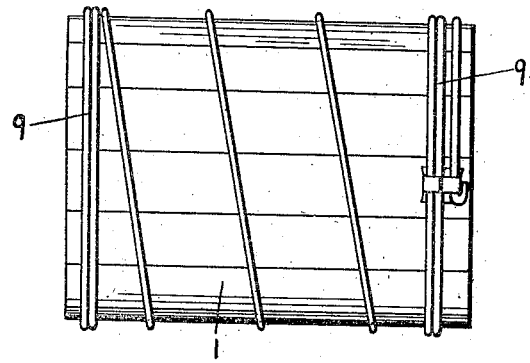
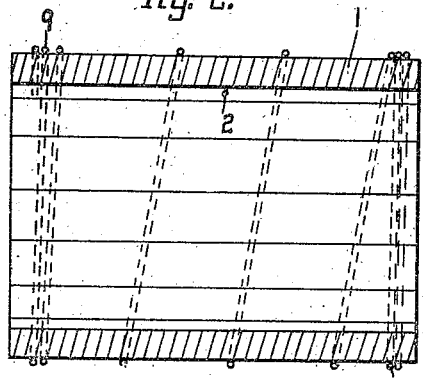
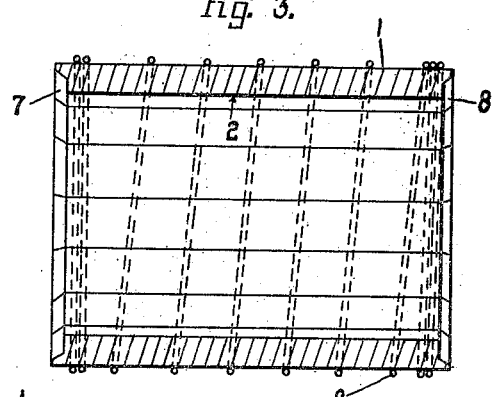
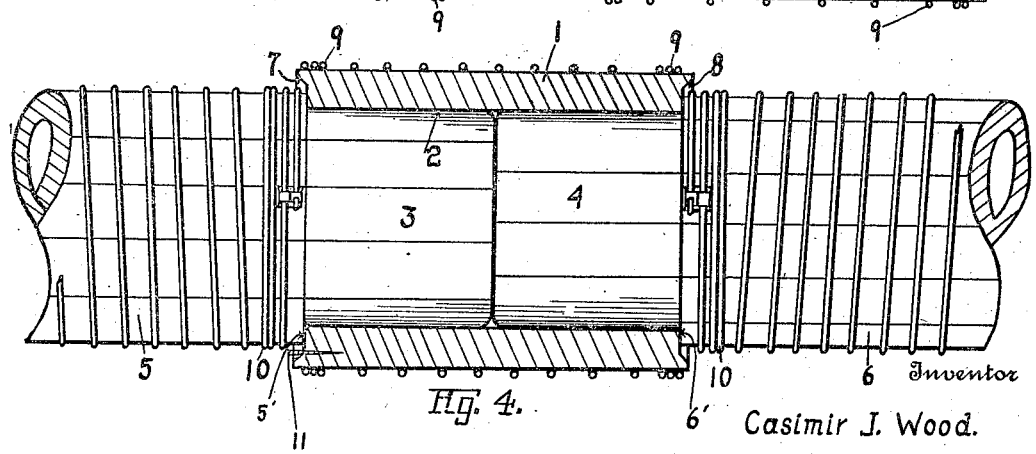
Inventor
Casimir J. Wood.
By Harry Q Schroeder
Attorney

UNITED STATES PATENT OFFICE.

CASIMIR J. WOOD, OF SAN FRANCISCO, CALIFORNIA.

MORTISE FOR PIPE-JOINTS.

1,369,155.  Specification of Letters Patent.  Patented Feb. 22, 1921.

Application filed May 12, 1919. Serial No. 296,676.

*To all whom it may concern:*

Be it known that I, CASIMIR J. WOOD, a citizen of the United States, residing at San Francisco, in the county of San Francisco and State of California, have invented certain new and useful Improvements in Mortises for Pipe-Joints, of which the following is a specification.

My invention is a mortise for pipe joints.

In certain pipe joints now in use, the inner surface of the joint sleeve being rough or irregular, leakage takes place through said sleeve. This leakage is eliminated by my invention.

My invention is illustrated in the accompanying drawing which forms a part of this specification and the appended claims.

Referring to the drawing:

Figure 1 is a side elevation of the sleeve of a wooden pipe joint embodying my invention.

Fig. 2 is a longitudinal section of said sleeve.

Fig. 3 is a view similar to Fig. 2 embodying a modification of my invention.

Fig. 4 is a longitudinal section of a pipe joint embodying the form of my invention as shown in Fig. 3.

In the drawing, 1 indicates a sleeve of a wooden pipe joint. The inner surface of said sleeve is reamed out, forming a smooth mortise 2 for the tenons 3 and 4 on the ends of pipe sections 5 and 6, the surface of which tenons are smoothed off to fit the mortise tightly, thus forming a most effective joint.

In the modified form of my invention, the ends of the sleeve 1 are formed with annular countersinks 7 and 8 in which and against the lower surface of which fit shoulders 5' and 6', formed on the pipe sections 5 and 6 between the outer surface of said pipe sections and their tenons 3 and 4; thus bringing end coils of wires 9 and 10, which are wrapped on the ends of sleeve 1 and said pipe sections, close together, leaving no gap or weak place in the joint between said coils. The countersinks are of greater diameter than the outer surface of said pipe sections so that wedge-shaped plugs 11 may be driven into the ends of the sleeve at places where leakage might occur, to cause the ends of the sleeve to fit the tenons tightly, and prevent leakage at said places.

Having described my invention, I claim:

1. The herein described pipe joint comprising pipe sections formed of longitudinally disposed strips arranged side by side and bound together by an external means, tenons on the adjacent ends of said pipe section, a sleeve in which said tenons are inserted comprising longitudinally disposed strips arranged side by side and bound together by an external wrapping, said sleeve having a smooth inner surface.

2. In a pipe joint, a sleeve, adjacent ends of pipe sections inserted in said sleeve and means engageable between the edges of said sleeve and said pipe sections for laterally shifting the sections relatively to the sleeve to form a tighter joint.

3. In a pipe joint, a sleeve, adjacent ends of the pipe sections inserted in said sleeve, shoulders formed on the ends of the sleeve and overhanging the pipe sections, and means insertible between the shoulders and pipe sections at any point around the circumference of the sleeve in order to laterally shift the respective pipe section and sleeve relative to each other for producing a tighter joint at the desired point.

4. In a pipe joint, a sleeve, adjacent ends of pipe sections inserted in the sleeve, overhanging shoulders formed on the ends of the sleeve, and a wedge device insertible between the shoulders and the pipe sections at any point on the circumference of the sleeve in order to laterally shift the respective pipe sections and sleeve relative to each other for producing a tighter joint at the desired point.

5. In a pipe joint, a sleeve, adjacent ends of pipe sections insertible in said sleeve, at least one end of the sleeve having shoulders thereon to overhang the pipe section, and means insertible between the shoulder and pipe section at any point on the circumference of the sleeve in order to laterally shift the sleeve and pipe section relative to each other for producing a tighter joint at any desired point.

In testimony whereof I affix my signature.

CASIMIR J. WOOD.